Feb. 15, 1966    M. MOUCHE ETAL    3,235,056
DEVICE FOR THE ASSEMBLING IN SERIES OF APPARATUS SUCH AS
WATCH-MOVEMENTS, MICRO-SWITCHES, VOLTMETERS, AMMETERS
AND THE LIKE
Filed May 31, 1962    4 Sheets-Sheet 1
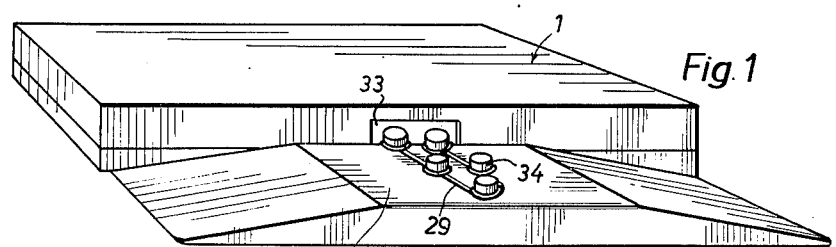
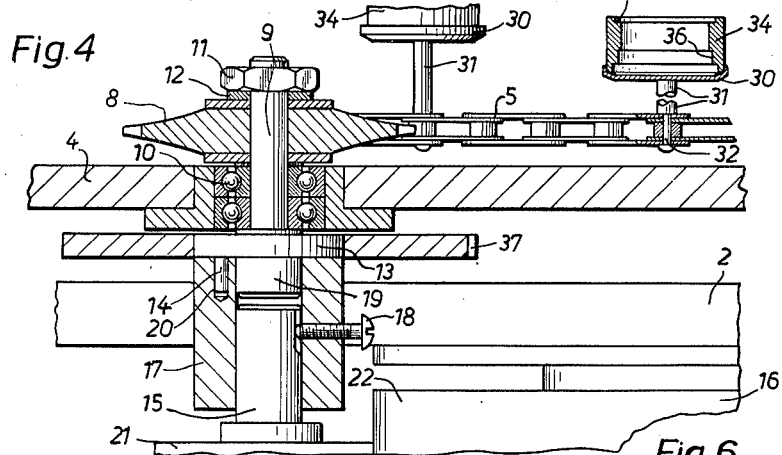
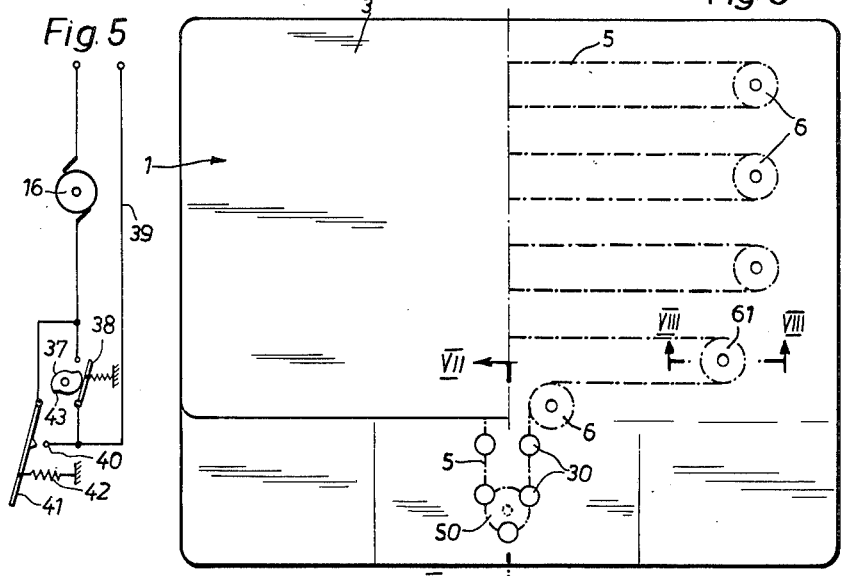

Feb. 15, 1966 M. MOUCHE ETAL 3,235,056
DEVICE FOR THE ASSEMBLING IN SERIES OF APPARATUS SUCH AS
WATCH-MOVEMENTS, MICRO-SWITCHES, VOLTMETERS, AMMETERS
AND THE LIKE
Filed May 31, 1962 4 Sheets-Sheet 2
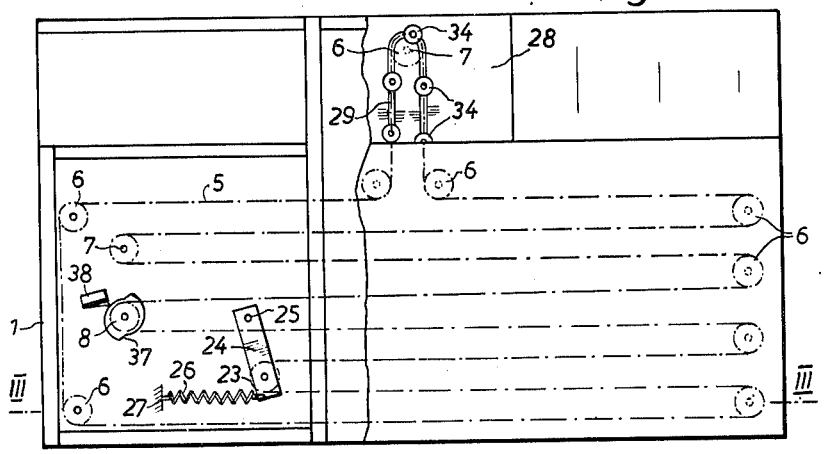

Feb. 15, 1966    M. MOUCHE ETAL    3,235,056
DEVICE FOR THE ASSEMBLING IN SERIES OF APPARATUS SUCH AS
WATCH-MOVEMENTS, MICRO-SWITCHES, VOLTMETERS, AMMETERS
AND THE LIKE
Filed May 31, 1962    4 Sheets-Sheet 3
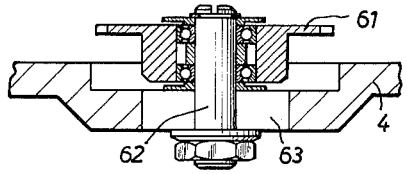
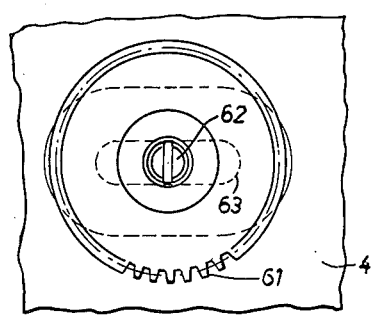
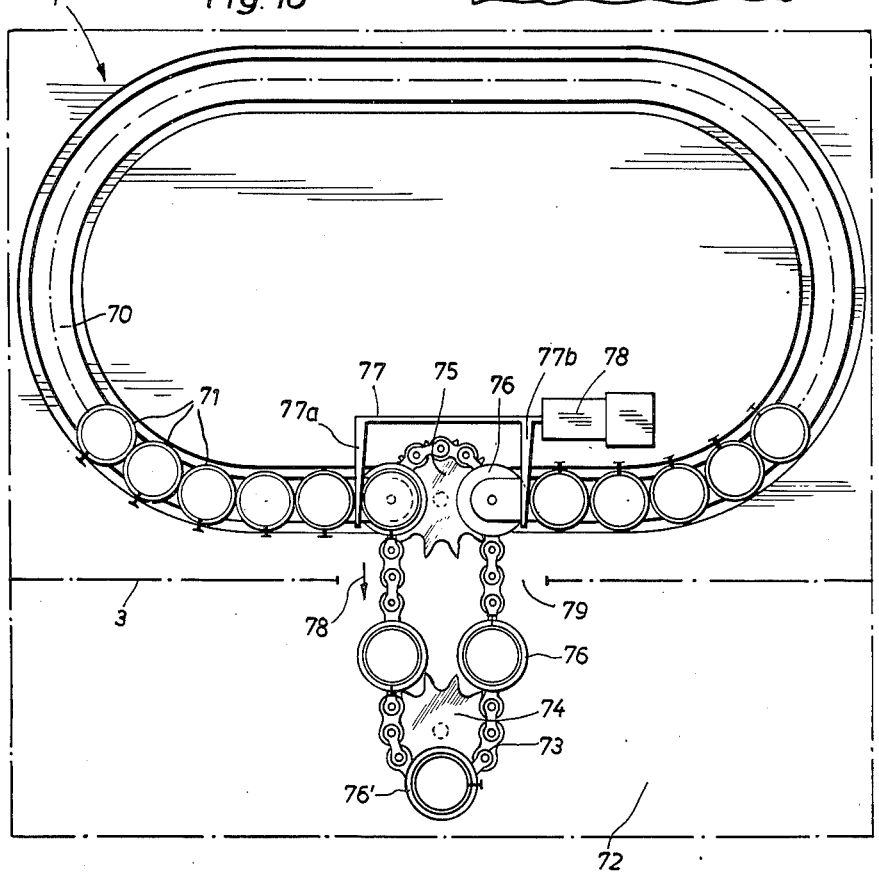
Michel Mouche and
Ernst Stauber Inventors
By Wenderoth, Lind and Ponack,
Attorneys Feb. 15, 1966 M. MOUCHE ETAL 3,235,056
DEVICE FOR THE ASSEMBLING IN SERIES OF APPARATUS SUCH AS
WATCH-MOVEMENTS, MICRO-SWITCHES, VOLTMETERS, AMMETERS
AND THE LIKE
Filed May 31, 1962

United States Patent Office 3,235,056
Patented Feb. 15, 1966

3,235,056
DEVICE FOR THE ASSEMBLING IN SERIES OF APPARATUS SUCH AS WATCH-MOVEMENTS, MICRO-SWITCHES, VOLTMETERS, AMMETERS AND THE LIKE
Michel Mouche, Solothurn, and Ernst Stauber, Lengnau, near Biel, Berne, Switzerland, assignors to Langendorf Watch Co., Solothurn, Switzerland
Filed May 31, 1962, Ser. No. 199,154
Claims priority, application Switzerland, June 6, 1961, 6,551/61
15 Claims. (Cl. 198—19)

The present invention relates to a device for the assembling in series of small-sized apparatus such as watch-movements, micro-switches, voltmeters, ammeters and the like.

Heretofore, and particularly in the watch-making field, the worker received in a small box a number of apparatus which he had to unpack in order to make some assembling or adjusting operations on them, whereafter he replaced these apparatus into the box, which was then brought to the working place of another worker specialized for other operations on the same apparatus and so on, until, after a certain number of such operations the apparatus were terminated. This method of working presents in today's conceive of the manufacture, rationalization and automatisation substantial drawbacks.

One of these drawbacks, and not the least of them, lies in the fact that each worker, in addition to the operations which he has to effect on each apparatus itself, has to unpack and, after having finished his series to repack all apparatus in order to put them into the box that is then passed to the next worker often only one yard away. This next worker, before starting the operations on the apparatus for which he is specialized has again to unpack these apparatus from the box and to repack them afterwards. All these packing and unpacking operations obviously result in a considerable loss of time and also in a considerable risk of damage for the apparatus.

Moreover, these apparatus, which are often very delicate, remain over long periods between their unpacking and repacking exposed to moisture and dust.

It is a prime object of the present invention to avoid all the above-mentioned drawbacks. To this end the present invention contemplates a device for the assembling in series of small-sized apparatus, such as watch-movements, micro-switches, voltmeters, ammeters and the like, which comprises conveying means supporting and guiding a series of supports adapted to receive each, in position for assembling, one apparatus to be assembled, these conveying means being arranged to their greater part, in a housing or casing where they are protected from moisture and dust. This housing or casing is destined to be placed on the working table of a worker, an opening provided in said housing affording for the passage of the supports towards the working place and driving means being provided for successively bringing each support to said working place.

In such a device the apparatus which are to be worked-on by one worker, exception made of that, that is actually worked-on and perhaps the adjacent apparatus to the latter are protected from dust and moisture in the housing.

By the provision of conveying and guiding means such as a chain or a conveyor band between the working tables and by providing the devices with means adapted to be engaged by these conveying and guiding means in such manner that, when the latter move the devices are engaged thereby and are all displaced simultaneously either to another working table or to a waiting position, one obtains an easy displacement of such a device from one working table to another, or successively to several other tables thereby affording for the successive assembling operations to be effected by several successive workers without time losses owing to packing and unpacking as heretofore.

In a preferred embodiment of the invention the device may be provided at the working place with a platform, the conveying and guiding means passing underneath this platform while the supports pass above of the latter, whereby connecting pieces between the conveying and guiding means and the supports traverse a slot in the platform closely following the path of the conveying and guiding means under the platform, the latter thereby serving as counter-support at the working place in order to stabilize the apparatus at that working place for the operations that shall take place there.

In order to reduce as far as possible errors in the positioning of the apparatus at the working place, such errors being due for example to a play or to a deformation in the conveying and guiding means the driving means for the latter may be placed in immediate vicinity of the working place.

Other features and advantages of the invention will become apparent from the description now to follow, of several embodiments thereof, given by way of example only, and in which reference will be made to the partly diagrammatical accompanying drawings, in which:

FIGURE 1 is a general perspective view of a first embodiment of a device in accordance with the invention.

FIGURE 2 is a top view of such a device with parts broken away to show the parts contained in it.

FIGURE 3 is a section taken along the line III—III of FIGURE 2.

FIGURE 4 shows, at enlarged scale, a detail of the device of FIGURE 1.

FIGURE 5 illustrates the electric diagram of the device of FIGURE 1.

FIGURE 6 illustrates diagrammatically, in a top view, a modification of the device shown in FIGURES 1 to 5.

FIGURE 7 shows, at enlarged scale, a section taken along the line VII—VII of FIGURE 6, illustrating in detail the driving mechanism of the device.

FIGURE 8 shows, at enlarged scale also, and following a section along the line VIII—VIII of FIGURE 6, another detail of the device of the latter figure.

FIGURE 9 shows a top view of the detail illustrated by FIGURE 8.

FIGURE 10 illustrates, diagrammatically, another embodiment of a device according to the present invention.

Figure 11:
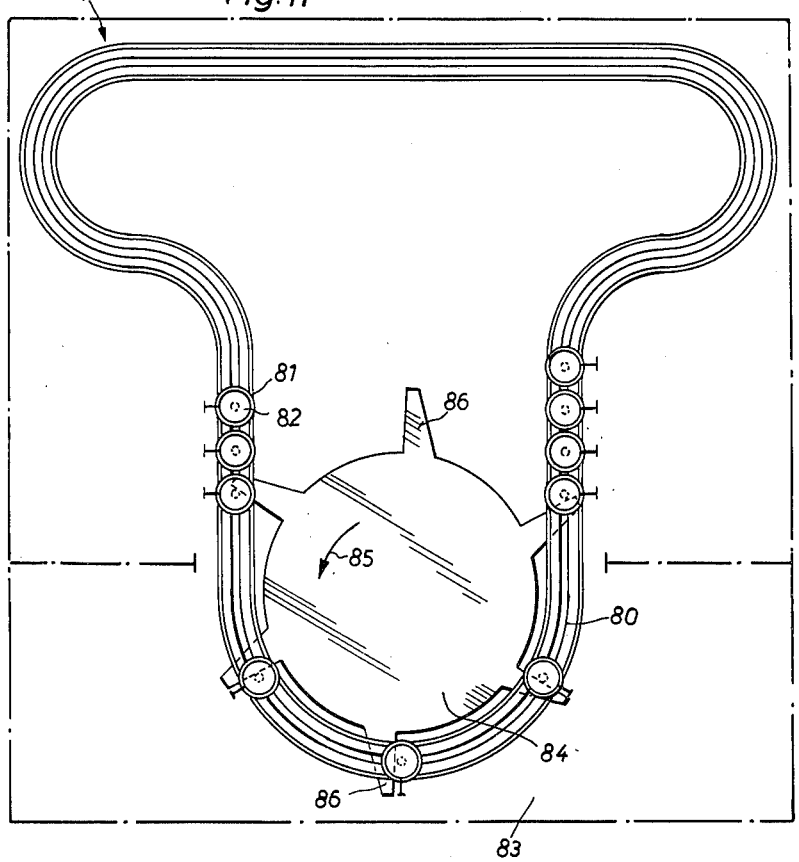
FIGURE 11 shows, also very diagrammatically, a third embodiment of a device according to the invention, and FIGURE 12, finally, shows in a top view and very diagrammatically, an assembling chain composed of several devices according to the invention.

The device represented in FIGURES 1 to 5 comprises a casing or housing 1 consisting of a rigid base 2 formed for example by a wooden or light metal plate and of a cover 3 which, advantageously, is made of a transparent material and which covers the whole of the base 2. Between the base 2 and the cover 3 there is arranged an intermediate plate 4. This plate 4, too, may be either of wood or of a light metal.

An endless conveying chain 5 is also arranged in the casing 1. This chain 5 may be of the "Reynold" type as it is widely used on bicycles. It is guided on pulleys 6 mounted on axles 7 secured to the intermediate plate 4. The pulleys 6 are arranged so as to impart to the chain 5 a zig-zag shaped path. The chain is driven as is visible on FIGURE 4 by a chain wheel 8 seated on a shaft 9 rotatably mounted in the intermediate plate 4 through roller bearings 10. The chain wheel 8 is secured to the shaft 9 by means of a nut 11. Reference numeral 12 indicates a washer arranged between the chain wheel and this nut.

The lower portion of the shaft 9 carries a disk 13 provided with a pin 14. This pin 14 is arranged eccentrically and projects perpendicularly away from the disk surface. This pin 14 affords for the coupling of the shaft 9 with a driving shaft 15 driven by an electromotor 16 (FIGURE 3). The shaft 15 in turn carries a sleeve 17 secured thereto by a screw 18 and adapted to be engaged about an extension 19 of the shaft 9, whereby a boring 20 in the sleeve 17 permits engagement of the sleeve about the pin 14. The shaft 15 is in turn driven by the motor 16 through a reduction gear arranged in a housing 21 coupled to the casing 22 of the motor 16 (FIGURE 3).

One of the guiding pulleys for the chain 5, i.e., that designated by reference numeral 23 in FIGURE 2, is carried on a lever arm 24 pivoted as at 25 to the intermediate plate 4. This arm 24 is loaded by a spring 26 secured as at 27 to the intermediate plate 4. By this arrangement the pulley 23, in combination with the arm 24 and the spring 26, forms a tensioning means for the chain 5.

The casing or housing 1 presents one one of its sides a prolongation constituting a platform 28. The chain 5 is guided by the pulleys 6 underneath this platform 28 and the latter is provided with a slot 29 closely following the path of the chain 5 under the platform 28.

The chain 5 carries a plurality of supports 30 connected with the chain elements by connecting pieces 31 which, in the represented embodiment and as shown in FIGURE 4 are formed by prolongations of the pivot axes 32 between adjacent chain elements. An opening 33 in the casing 1 affords for the passage of the supports 30 out of the casing and onto the platform and the working place formed thereby. The connecting pieces 31 pass through the slot 29. Onto each of the supports 30 there is arranged a piece-holder 34 adapted to receive one apparatus to be assembled. In the represented embodiment each of the piece-holders 34 has, on opposite sides, a shape 35 and 36, respectively, each adapted to receive an apparatus to be mounted, for example a micro-switch or a watch-movement. The two shapes 35 and 36 on one and the same piece-holder 34 are of different dimensions so as to permit use of the described device for assembling apparatus of different sizes by inversing the piece-holders 34 on their supports 30.

As is easily understood from the preceding description the starting of the motor 16 results in the movement of the chain 5 and in the successive passage of the supports 30 on the working place constituted by the platform 28. Moreover the latter serves as a counter-support at the working place for stabilizing at this precise point the apparatus to be assembled.

However, in order that the worker may effect a determinated operation or several determinated operations on each of the apparatus in the device when it comes to the working place it is necessary to have these apparatus fed to the working place stepwise. To this end the shaft 9 carries a cam 37 arranged about the disk 13. This cam 37 serves to control a switch 38 connected into the feed circuit 39 for the motor 16. The cam surface of this cam 37 is of such shape as to produce an interruption in the feed of electrical current to the motor 16 after each displacement of the claim 5 about a distance equal to that separating to adjacent connecting pieces 31. Moreover the position of the cam 37 on the shaft 9 is such that each time the chain 5 stops a support 30 is exactly on the extreme position on the platform 28, which position corresponds to the working place and which also is that position which makes accessible the apparatus to be assembled as well from the sides as also from the front side of the device. After having terminated the assembling operations which he has to effect on the apparatus which is on the working place the worker produces a next displacement step of the chain 5 by actuating a switch 40 which in turn shunts the switch 38. Preferably this switch 40 is controlled by a lever 41 arranged to be actuated by the knee of the worker. This switch 40 normally is maintained in open position by a switch 42. In order to obtain the advance of the chain about one step all the worker has to do is to shortly actuate lever 41 which starts the motor 16. The motor starts to run even after the worker has released the lever 41, since the cam 37 having rotated about a certain angle makes possible for the switch 38 to be closed. The chain is driven until the next boss 43 on the cam surface of the cam 37 again opens the switch 38 which happens as soon as the next following support 30 is on the extreme position on the platform that was just left by the preceding apparatus after the assembling operations had been made on it.

FIGURES 6 to 9 diagrammatically show a modification of the device of FIGURES 1 to 5 whereby the modified parts only are shown in more detail.

In order to avoid or at least to reduce as far as possible errors in the positioning of the apparatus to be assembled on their working place, which errors may be due to a play in the chain or to deformations thereof, the driving means for the chain, in the modification shown in FIGURES 6 to 9 are placed at the working place itself, i.e., it is effected by a chain wheel 50 arranged at the working place. This chain wheel is secured to a shaft 51 mounted for rotation in ball bearings 52 carried in a sleeve 53 fixed in an opening in the platform 28 as shown in FIGURE 7. The stepwise driving of the chain 5 by the chain wheel 50 and its shaft 51 is effected through a coupling 54, 55 of the shaft 51 with a shaft 56 of an electromotor 57. The starting of the latter and the stopping thereof for the stepwise advance may be obtained as described for the first embodiment by means of a micro-switch, one of which is shown as at 58 with a feeler 59 engaging a pin 60 rotating with the shaft 51.

The device shown in FIGURES 6 to 9 further presents with respect to the embodiment of FIGURES 1 to 5 a different means for maintaining the chain 5 which makes possible to dispense with the arm 24 and the spring 26 shown in the first example. To this end, and as is particularly visible from FIGURES 8 and 9, one of the pulleys guiding the chain, in the drawing it is the pulley 61, is mounted for free rotation on an axle 62 the position of which may be adjusted in a slot 63 in the intermediate plate 4 parallelly to the path of the chain.

It should be noted further that the device shown in FIGURES 6 to 9 has a small support 64 mounted on the platform 28 at the working place. The supports 30 glide onto this support 64 at the working place so that each apparatus arriving at the working place is not only stabilized by the support 30 against lateral displacements but also vertically, which highly facilitates the effecting of the assembling operation since the worker may use both hands therefor while otherwise he may have to use one hand for holding the apparatus stable.

The device for assembling in series small-sized apparatus, which is shown in FIGURE 10 of the drawing, as the preceding devices comprises a casing 1 consisting of a rigid base and of a removable cover 3 preferably of transparent material. Also, as in the previous examples, an intermediate plate is arranged between the base and the cover 3.

In this casing 1 there is mounted protected from dust by the cover 3 a guiding 70 formed of rails. This guiding is of oval shape and serves to guide and to stock supports or piece-holders 71 arranged to receive and removably maintain each an apparatus to be assembled, for example a micro-switch or a watch-movement.

In the represented embodiment, which shows the device in use for the assembling of watch-movements, the elements 71 are formed by watch-movement holders. These holders may freely slide along the guiding 70.

The casing 1 is provided on one of its sides with an extension forming a platform 72 similar to the platform 28 of the preceding examples. Underneath this platform 72 there is loged a chain 73 of the "Reynold" type. This chain is entrained by a chain wheel 74 and it is guided about a pulley 75 which is arranged within the casing 1 underneath an interruption in the guiding 70. The chain 73 carries a plurality of supports 76, in the represented embodiment there are five such supports 76, and these supports are connected with the chain elements by connecting pieces in the form of pins traversing a slot in the platform 72 and in the intermediate plate within the casing 1. This slot, as in the preceding examples closely follows the path of the chain under the platform. Preferably also the connecting pieces are formed by prolongations of some of the pivot axes between adjacent chain elements of the chain.

An opening 79 in the casing 1 towards the platform makes possible the passage of the supports 76 out of the casing and, following the path of the chain, onto the platform and more particularly to the working place indicated, in FIGURE 10, by the support designated by 76'.

A loading and unloading mechanism is arranged in the casing bridging an interruption of the guiding 70 at the place of the pulley 75 for the chain. This mechanism, which is shown diagrammatically only, comprises a fork 77 actuated by a driving means 78 in synchronism with the chain 73. The latter is in turn entrained stepwise as described for the preceding examples, the arrangement being such that at each stepwise advance of the chain in direction of arrow 78, a piece-holder 71 carrying an apparatus to be assembled, is seized by the arm 77a of the fork 77 to be fed from the guiding 70 and onto a support 76 which at this precise moment is in a receiving position at the end of the guiding. Simultaneously, the other arm 77b of the fork pushes an apparatus which already has passed the working place from its support 76 and onto the guiding 70. This support 76 thus becomes free to receive a further apparatus to be assembled at a future actuation of the chain.

Thus, as in the preceding examples, only a part of the apparatus, namely the apparatus which are on the supports 76 carried by the chain 73, are not protected from dust and from moisture, while the major part of these apparatus as well those waiting at the left in the guiding 70 to be worked on by the worker at the working place as also those at the right on the guiding which already have passed the working place are protected within the casing 1.

The guiding 70 being filled with apparatus to be assembled all will have been worked-on as soon as at the left in the guiding there will appear again an apparatus which already has passed the working place. Then the whole device may be transported to another working table where the apparatus contained therein will undergo other assembling operations.

In order to make possible for the worker to effect a determined number of operations on the apparatus contained in each device, it is necessary to provide for a stepwise advance of the chain 73. This is possible in the same way as described with respect to the example of FIGURES 1 to 5.

It is to be noted that in the last-mentioned embodiment the chain again is entrained by a chain wheel placed at the working place in order to reduce as far as possible errors in the positioning of the apparatus on the working place.

The device illustrated in FIGURE 11 differs from that of FIGURE 10 by a different means for feeding to the working place the apparatus placed on their supports or holders, respectively, in a guiding within the casing.

In accordance with this embodiment the guiding 80, similar to the guiding 70 of FIGURE 10, follows a path similar to the path of the chain 5 in the example of the FIGURES 1 to 5.

The apparatus to be assembled are designated by 82 and are placed side by side in this guiding 80 in their piece-holders 81 within the casing 1 and are brought one after the other to the working place on the platform 83 of the device by a Geneva wheel 84 driven stepwise in direction of arrow 85 by a driving mechanism (not represented) arranged underneath the platform 83. The arms 86 of the Geneva wheel 84 engage a pin which protrudes from the base of each piece-holder 81 through a slot 78 in the guiding 80.

The stepwise actuation of the Geneva wheel 84 by the worker in accordance with the requirements of the assembling operations may be similar to that described with respect to FIGURES 1 to 5 or 6 to 9. After the passage of the apparatus on the working place they are pushed in the guiding 80 back into the casing 1.

Figure 12:
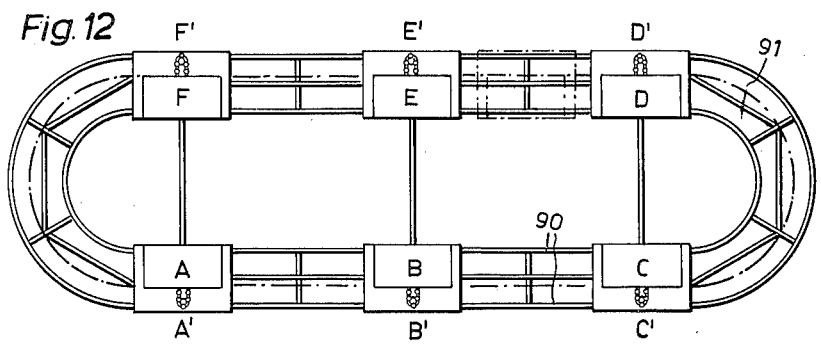

FIGURE 12 finally shows an assembling chain comprising six devices A–F of the described type.

Each of the six devices is provided with wheels by means of which it may be displaced on rails 90 passing in front of six working tables designated by A'–F'. Each of the devices may be provided with its own driving motor but it may be advantageous to provide each working table A'–F' with a motor, whereby removable coupling means similar to the coupling with a sleeve 17 and a pin 14 as described with respect to the example of FIGURES 1 to 5 may easily permit such realization. It is also possible to provide between subsequent working tables conveying means 91, for example a chain or a conveyor band, and to provide all the devices A–F with means adapted to be engaged by these transport means in such manner that each time the transport means 91 are started the devices A–F are engaged by these means and are displaced simultaneously towards the next following working table. After such a displacement the device A will be at the working place B', device B at the working place C', etc., up to the device F which after having passed through the whole assembling chain will be evacuated therefrom to a next assembling chain or will be emptied from the apparatus to receive new ones which will start in the assembling chain at the working table A'.

It may also be possible to provide between subsequent working tables waiting positions to which may be directed some of the devices to compensate irregularities that may occur in the sequence of the operations.

Further also the motor means instead of comprising an electromotor could be formed by purely mechanical means actuated by the worker himself. For example it could be possible to provide pedal means actuated by the knee or by hand for step-wisely displacing the guiding and conveying means.

Other motor means may be used, for example compressed air means which could comprise a piston sliding in a cylinder, one valve thereof controlling the compressed air feed and being adapted to be actuated by the worker.

The above-mentioned devices may be used for assembling a great number of different small-sized apparatus such as electrical apparatus, ammeters, voltmeters or else but also the device may be used in jewelry making for example for the setting of precious stones in rings and like jewelry pieces. But most particularly the device may greatly rationalize the assembling of watch-movements.

We claim:

1. An apparatus for supporting, storing and conveying small devices which are being assembled, said apparatus comprising an intermittently movable assembly line conveyor means having a plurality of assembly stations along its length, assembly line conveyor drive means coupled to said assembly line conveyor for intermittently driving said assembly line conveyor, and a plurality of working and storage devices on said assembly line conveyor and conveyed by said assembly line conveyor in its intermittent movement, each working and storage device comprising housing having an opening therein opening laterally of said housing so as to open toward a worker at an assembly station, said work holding means within said housing extending at least to said opening in said housing and holding a plurality of devices being assembled and along which said devices can be moved, whereby the devices being assembled are stored in a housing of a working and storage device at one assembly station and can be moved out of said housing one at a time where they can be worked on and then returned to said work holding means in said housing, and when all the devices in the working and storage device have been worked on, the working and storage device can be moved by the assembly line conveyor to the next assembly station.

2. An apparatus as claimed in claim 1 in which said work holding means within said housing extends out of said housing through the opening in said housing and back into said housing and in an endless path within said housing.

3. An apparatus for supporting, storing and conveying small devices which are being assembled, said apparatus comprising an intermittently movable assembly line conveyor means having a plurality of assembly stations along its length, assembly line conveyor drive means coupled to said assembly line conveyor for intermittently driving said assembly line conveyor, and a plurality of working and storage devices on said assembly line conveyor and conveyed by said assembly line conveyor in its intermittent movement, each working and storage device comprising at least a working platform, a base, a work holding means supported on said base, and a housing covering said base and work holding means, said housing having an opening therein opening out onto said working platform, said work holding means within said housing extending out of said housing through the opening in said housing onto said platform and back into said housing and in an endless path within said housing and holding a plurality of devices being assembled and along which said devices can be moved, whereby the devices being assembled are stored in a housing of a working and storage devices at one assembly station and can be moved out of said housing onto the platform one at a time where they can be worked on and then returned to said housing, and when all the devices in the working and storage device have been worked on, the working and storage device can be moved by the assembly line conveyor to the next assembly station.

4. An apparatus as claimed in claim 3 in which said working and storage device further comprises driving means coupled to said work holding means for driving devices to be worked on along said work holding means, said driving means being adapted to be intermittently actuated by an operator at an assembly station.

5. An apparatus for supporting, storing and conveying small devices which are being assembled, said apparatus comprising an intermittently movable assembly line conveyor means having a plurality of assembly stations along its length, assembly line conveyor drive means coupled to said assembly line conveyor for intermittently driving said assembly line conveyor, and a plurality of working and storage devices on said assembly line conveyor and conveyed by said assembly line conveyor in its intermittent movement, each working and storage device comprising at least a working platform, a base, a work holding means supported on said base, and a housing covering said base and work holding means, said housing having an opening therein opening out onto said working platform, said work holding means being an intermittently movable work conveyor within said housing and extending through said opening to said platform and back into said housing and in an endless path within said housing and having device holding members thereon for holding the devices to be assembled, whereby the devices being assembled are stored in a housing of a working and storage device at one assembly station and moved out onto said platform intermittently where they can be worked on and then returned to said housing, and when all the devices on the work conveyor have been worked on, the working and storage device can be moved by the assembly line conveyor to the next assembly station.

6. An apparatus as claimed in claim 5 in which said working and storage device further comprises driving means for said conveyor adapted to be intermittently actuated by an operator at an assembly station.

7. An apparatus as claimed in claim 6 in which said platform has a slot therein along the path of said work conveyor, said work conveyor moving beneath said platform, and said device holding members extending through the slot in said platform and resting against the platform for supporting the devices being worked on when they are on the platform.

8. An apparatus as claimed in claim 7 in which said work conveyor comprises an endless chain and said driving means for said work conveyor comprises toothed pulleys engaging said chain and driving it, said endless chain extending in a sinous path within said housing.

9. An apparatus as claimed in claim 7 in which said device holding members comprise a device holding piece having recesses at the opposite ends thereof which differ in shape from each other, said pieces being mounted on said work conveyor so that they can be placed with one or the other ends thereof opening upwardly, whereby when the recess in one end opens upwardly a device of one shape can be held by the device holding piece and when the recess in the other end thereof opens upwardly a device of another shape can be held.

10. An apparatus for supporting, storing and conveying small devices which are being assembled, said apparatus comprising an intermittently movable assembly line conveyor means having a plurality of assembly stations along its length, assembly line conveyor drive means coupled to said assembly line conveyor for intermittently driving said assembly line conveyor, and a plurality of working and storage devices on said assembly line conveyor and conveyed by said assembly line conveyor in its intermittent movement, each working and storage device comprising at least a working platform, a base, a housing covering said base, said housing having an opening therein opening out onto said working platform, work holding and guiding means within said housing along which the devices can be moved, and a work conveyor extending from said work holding and guiding means out through the opening in said housing and back into said housing and in an endless path within said housing and conveying the devices to be worked on one at a time from said work holding and guiding means out through the opening and onto said platform and conveying a device already worked on back into the housing and back into the work holding and guiding means, said work conveyor including drive means for intermittently driving it, and means within said housing for transferring devices from said work holding and guiding means to said work conveyor and for transferring a device from said work conveyor to said work holding and guiding means, whereby the devices being assembled are stored in a housing of a working and storage device at one assembly station and can be moved out of said housing onto the platform one at a time where they can be worked on and then returned to said housing, and when all the devices in the working and storage device have been worked on, the working and storage device can be moved by the assembly line conveyor to the next assembly station.

11. An apparatus for supporting, storing and conveying small devices which are being assembled, said apparatus comprising an intermittently movable assembly line conveyor means having a plurality of assembly stations along its length, assembly line conveyor drive means coupled to said assembly line conveyor for intermittently driving said assembly line conveyor, and a plurality of working and storage devices on said assembly line conveyor and conveyed by said assembly line conveyor in its intermittent movement, each working and storage device comprising at least a working paltform, a base, a housing covering said base, said housing having an opening therein opening out onto said working platform, work holding and guiding means within said housing and extending out through said opening in said housing and onto said platform and back into said housing and in an endless path within said housing and along which the devices can be moved, and a work driving means on said platform for engaging devices on the work holding and guiding means and moving them one at a time along the portion of the work holding and guiding means on the platform from within the housing to a position on the platform and moving a device which has been worked on from the platform back into the housing, whereby the devices being assembled are stored in a housing of a working and storage device at one assembly station and can be moved out of said housing onto the platform one at a time where they can be worked on and then returned to said housing, and when all the devices in the working and storage device have been worked on, the working and storage device can be moved by the assembly line conveyor to the next assembly station.

12. A working and storage device for an apparatus for supporting, storing and conveying small devices which are being assembled, and which has an intermittently movable assembly line conveyor means and a plurality of assembly stations along the length of said assembly line conveyor, said working and storage device comprising at least a working platform, a base, a housing covering said base, said housing having an opening therein opening out onto said working platform, and work holding means within said housing and having a portion which extends out of said housing through the opening in said housing onto said platform and back into said housing and in an endless path within said housing and holding a plurality of devices being assembled and along which said devices can be moved, said devices being spaced along said work holding means at distances such that no more than from three to five devices are outside said housing on said platform at any one time, intermittently operable driving means operatively associated with said work holding means for moving devices along said work holding means, an actuating means forming part of said driving means and positioned adjacent said working platform and which must be actuated by an operator at the working platform for moving devices along said work holding means onto the platform and from the platform back into the housing, whereby the devices being assembled are stored in a housing of a working and storage device at one assembly station and can be moved out of said housing onto the platform one at a time where they can be worked on and then returned to said housing and only the device being worked on and at most two devices ahead and two devices behind are exposed to dust and moisture in the atmosphere of the working space at any one time.

13. A working and storage device for an apparatus for supporting, storing and conveying small devices which are being assembled, and which has an intermittently movable assembly line conveyor means and a plurality of assembly stations along the length of said assembly line conveyor, said working and storage device comprising at least a working platform, a base, a housing covering said base and having an opening therein opening out onto said working platform, and an intermittently movable work conveyor on said base within said housing and having a portion which extends through said opening to said platform and back into said housing and in an endless path within said housing and having device holding members thereon for holding the devices to be assembled, said devices being spaced along said work holding means at distances such that no more than from three to five devices are outside said housing on said platform at any one time, intermittently operable driving means connected to said work conveyor for moving devices along said work conveyor, an actuating means forming part of said driving means and positioned adjacent said working platform and which must be actuated by an operator at the working platform for moving devices along said work conveyor onto the platform and from the platform back into the housing, whereby the devices being assembled are stored in a housing of a working and storage device at one assembly station and moved out onto said platform intermittently where they can be worked on and then returned to said housing and only the device being worked on and at most two devices ahead and two devices behind are exposed to dust and moisture in the atmosphere of the working space at any one time.

14. A working and storage device for an apparatus for supporting, storing and conveying small devices which are being assembled, and which has an intermittently movable assembly line conveyor means and a plurality of assembly stations along the length of said assembly line conveyor, said working and storage device comprising at least a working platform, a base, a housing covering said base and having an opening therein opening out onto said working platform, work holding and guiding means on said base within said housing along which the devices can be moved, and a work conveyor extending from said work holding and guiding means out through the opening in said housing and back into said housing and in an endless path within said housing and conveying the devices to be worked on one at a time from said work holding and guiding means out through the opening and onto said platform and conveying a device already worked on back into the work holding and guiding means, said devices being spaced along said work conveyor at distances such that no more than from three to five devices are outside said housing on said platform at any one time said work conveyor including drive means for intermittently driving it, and means within said housing for transferring devices from said work holding and guiding means to said work conveyor and for transferring a device from said work conveyor to said work holding and guiding means, and actuating means connected to said drive means and positioned adjacent said working platform and which must be actuated by an operator at the working platform for moving devices along said work conveyor onto the platform and from the platform back into the housing, whereby the devices being assembled are stored in a housing of a working and storage device at one assembly station and can be moved out of said housing onto the platform one at a time where they can be worked on and then returned to said housing and only the device being worked on and at most two devices ahead and two devices behind are exposed to dust and moisture in the atmosphere of the working space at any one time.

15. A working and storage device for an apparatus for supporting, storing and conveying small devices which are being assembled, and which has an intermittently movable assembly line conveyor means and a plurality of assembly stations along the length of said assembly line conveyor, said working and storage device comprising at least a working platform, a base, a housing covering said base and having an opening therein opening out onto said working platform, work holding and guiding means on said base within said housing and having a portion which extends out through said opening in said housing and onto said platform and then returned to said work holding means in said housing and along which the devices can be moved, and a work driving means on said platform for engaging devices on the work holding and guiding means and moving them one at a time along the portion of the work holding and guiding means on the platform from within the housing to a position on the platform and moving a device which has been worked on from the platform back into the housing, said devices being spaced along said work holding means at distances such that no more than from three to five devices are outside said housing on said platform at any one time, and actuating means connected to said working driving means and positioned adjacent said working platform and which must be actuated by an operator at the working platform for moving devices along said work holding and guiding means onto the platform and from the platform back into the housing, whereby the devices being assembled are stored in a housing of a working and storage device at one assembly station and can be moved out of said housing onto the platform one at a time where they can be worked on and then returned to said housing and only the device being worked on and at most two devices ahead and two devices behind are exposed to dust and moisture in the atmosphere of the working space at any one time.

References Cited by the Examiner

UNITED STATES PATENTS

| | | | |
|---|---|---|---|
| 958,475 | 5/1910 | Cannon | 198—181 |
| 1,106,222 | 8/1914 | Johnson | 198—22 X |
| 1,445,093 | 2/1923 | Lindahl | 198—22 X |
| 1,980,850 | 11/1934 | Clark | 214—16.12 |
| 2,043,763 | 6/1936 | Meyer | 198—22 X |
| 2,437,702 | 3/1948 | Muller | 198—131 |
| 2,561,828 | 7/1951 | Springsteen | 221—76 |
| 2,751,064 | 6/1956 | Russell | 198—131 |
| 2,983,393 | 5/1961 | Campbell | 198—181 |

FOREIGN PATENTS

| | | |
|---|---|---|
| 1,166,494 | 6/1958 | France. |

SAMUEL F. COLEMAN, *Primary Examiner.*

WILLIAM B. LABORDE, ERNEST A. FALLER,
*Examiners.*